Figure 1:
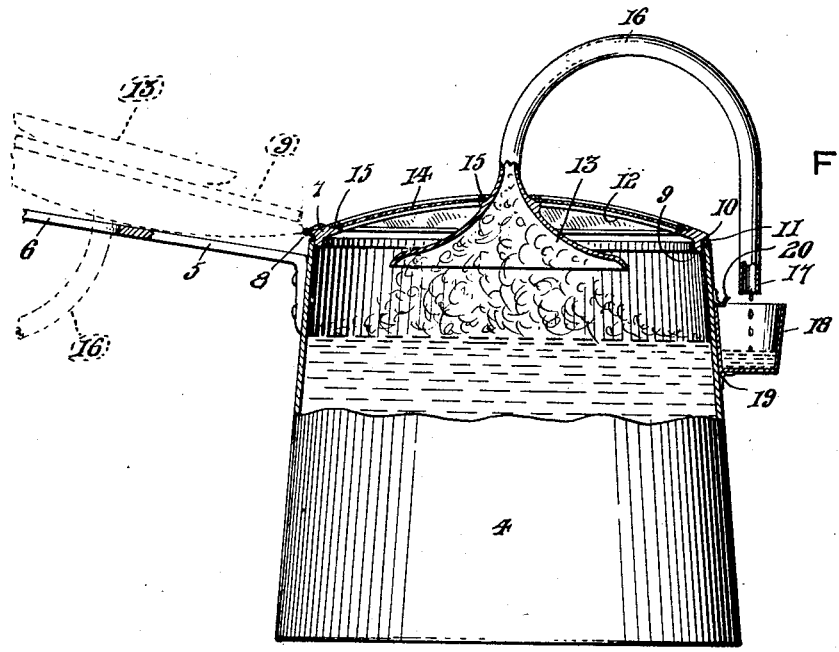

M. HANKULICH.
MILK BOILER.
APPLICATION FILED SEPT. 16, 1919.

1,340,336.

Patented May 18, 1920.

Inventor
M. Hankulich

By A. M. Wilson
Attorney

UNITED STATES PATENT OFFICE.

MICHAEL HANKULICH, OF STOCKDALE, PENNSYLVANIA.

MILK-BOILER.

1,340,336.  Specification of Letters Patent.  Patented May 18, 1920.

Application filed September 16, 1919. Serial No. 324,161.

*To all whom it may concern:*

Be it known that I, MICHAEL HANKULICH, a citizen of Czecho-Slovakia, residing at Stockdale, in the county of Washington and State of Pennsylvania, have invented certain new and useful Improvements in Milk-Boilers, of which the following is a specification.

The primary object of the present invention resides in the provision of a cooking utensil especially designed for the boiling of milk wherein an overflow of the material during the boiling operation is obviated and steam escaping from the container confined and condensed for reception in an adjacently positioned receptacle thus completely obviating the boiling over of the liquid and the escape of steam.

With the above and other objects in view, the invention consists in the novel form, combination and arrangement of parts herein more fully described and shown in the accompanying drawing, and wherein like reference characters indicate similar parts throughout the several views.

Figure 2:
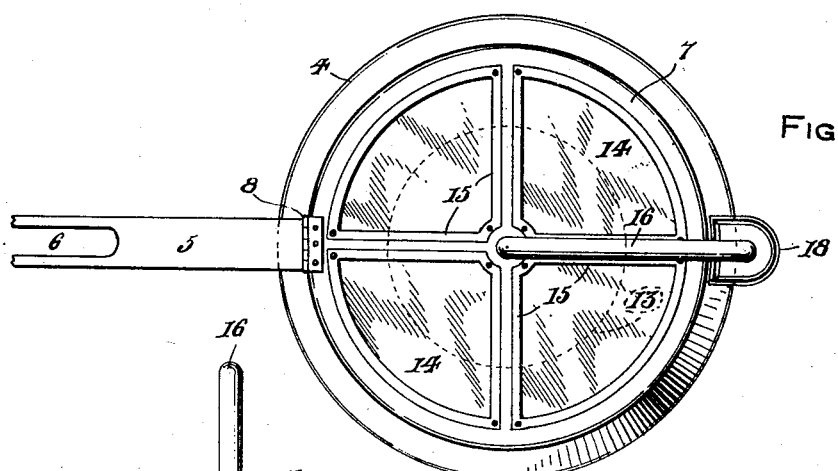
Figure 3:
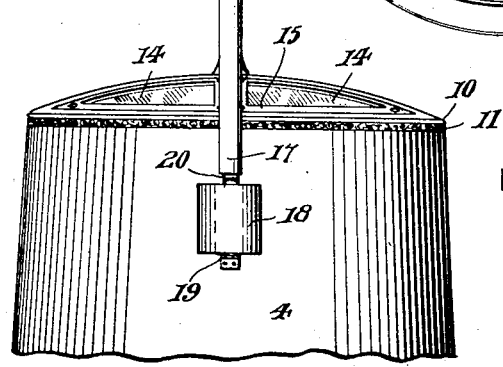

In the drawing,

Figure 1 is a side elevational view, partly in section of a milk boiler constructed in accordance with the present invention, the cover being shown in dotted position as open, Fig. 2 is a top plan view of the same showing the slotted handle for accommodating the steam pipe when the lid is opened and Fig. 3 is a fragmentary front elevational view of the boiler showing the condensation collection receptacle hinged exteriorly of the boiler.

Briefly described, the present invention aims to provide a milk boiler especially designed to prevent the boiling over of the liquid during the heating thereof, there being provided a container having a transparent cover substantially sealed thereon with a bell-shaped member carried centrally of the cover and adapted for centralizing the passage of steam from the receptacle through a condensing conduit which is in communication with a smaller receptacle hinged to the outer wall of the boiler, the handle of the boiler being slotted for the reception of the steam conduit pipe when the cover is moved to its open position for purposes of filling the boiler. The cover includes a skeleton frame in which is secured a transparent plate such as glass or mica whereby the contents of the receptacle may be visually inspected during the boiling of the liquid when the lid is closed.

Referring more in detail to the accompanying drawing, there is illustrated a milk boiler 4 in the form of a container having a handle 5 connected thereto and which handle is longitudinally slotted as at 6 for purposes presently to appear.

The cover 7 is hinged as at 8 to the upper edge of the container at a point directly over the handle 5 and when in closed position on the container has a depending flange 9 extending downwardly into the container with an outstanding flange 10 overlying the upper edge of the container and resting upon a packing element 11, such as asbestos. The cover 7 is of skeleton formation embodying the ring portion adjacent the edge of the container 4 as illustrated in Fig. 1 and has radially extending spiders 12 supporting centrally of the container 4 a bell-shaped member 13 which extends beneath the same and into the container 4 to be centrally positioned over the boiling fluid contained therein. A transparent sheet 14 is supported on the spiders 12 and clamped thereon by the strips 15.

A steam conduit pipe 16 is preferably formed integral with the bell-shaped member 13 and extends outwardly of the container 4 with the lower open end 17 terminating above the drip pan 18 hingedly connected as at 19 exteriorly of the container 4 and retained in upright position by a spring finger catch 20.

When it is desired to fill the container 4, with fluid such as milk to be boiled or heated, the cover 7 is moved upon its hinge connection 8 with the container to cause the steam conduit pipe 17 to be passed through the slotted opening 6 in the handle 5 with the cover supported on the handle. The cover is placed above the receptacle after the fluid has been placed therein with the flanged portion 10 thereof resting upon the asbestos strip 11 substantially to prevent all escape of vapors from the receptacle. The contents of the receptacle are readily viewable through the transparent cover sections 14 and the boiling of the contents may be carefully observed. Steam and vapors are centralized in the bell-shaped member 13 and escape through the pipe 16, which pipe is of such length as substantially to cause a complete condensation of vapors passing therethrough before delivery into the catch pan 18 positioned exteriorly of the container 4. The drip or catch pan 18 may be emptied by releasing the spring finger 20 to permit the same to move upon its hinge connection 19 for purposes of either disposing of the contents thereof or returning the same to the container 4.

While there is herein shown and described what is believed to be the preferred embodiment of the invention, it is nevertheless to be understood that minor changes may be made in the form, combination and arrangement of parts without departing from the spirit and scope of the invention as claimed.

What is claimed as new is:—

1. A milk boiler comprising a container, a handle carried thereby, a cover hinged to said container and a vapor conduit carried by said cover for conveying vapor from said container to a point exteriorly thereof, said vapor conduit including a bell-shaped member carried by the cover upon the lower side thereof for directing the vapors in the container into said conduit.

2. A milk boiler comprising a container, a handle carried thereby, a cover hinged to said container, a vapor conduit carried by said cover for conveying vapor from said container to a point exteriorly thereof, said vapor conduit including a bell-shaped member carried by the cover upon the lower side thereof for directing the vapors in the container into said conduit, and an asebstos packing between the cover and upper edge of the container.

3. A milk boiler comprising a container, a cover hinged thereon, a bell-shaped member carried by the lower side of said cover, a conduit exteriorly of said cover in communication with said bell-shaped member and a drip pan carried exteriorly of said container in communication with said conduit.

In testimony whereof I affix my signature.

MICHAEL HANKULICH.